United States Patent [19]

Griffiths et al.

[11] Patent Number: 5,734,567
[45] Date of Patent: Mar. 31, 1998

[54] DIAGNOSIS SYSTEM FOR A PLANT

[75] Inventors: Antony Griffiths, Kleinsendelbach; Helmut Müller, Nürnberg, both of Germany

[73] Assignee: Siemens Aktiengesellschaft, Munich, Germany

[21] Appl. No.: 710,972

[22] Filed: Sep. 24, 1996

Related U.S. Application Data

[63] Continuation of Ser. No. 437,278, filed as PCT/DE93/01012, Oct. 25, 1993, published as WO94/11822, May 26, 1994, abandoned.

[30] Foreign Application Priority Data

Nov. 6, 1992 [DE] Germany .................... 42 37 575.4

[51] Int. Cl.⁶ ............................................. G05B 9/02
[52] U.S. Cl. ................ 364/184; 364/185; 395/183.01
[58] Field of Search .............................. 364/131–136, 364/184–187, 550, 551.01, 552, 556, 570; 324/512; 395/183.01, 183.02, 183.06, 183.07, 183.13, 183.16–183.2, 183.22

[56] References Cited

U.S. PATENT DOCUMENTS

| | | | |
|---|---|---|---|
| 4,841,456 | 6/1989 | Hogan, Jr. et al. | 364/550 |
| 4,933,833 | 6/1990 | Petroff | 364/184 |
| 4,967,337 | 10/1990 | English et al. | 364/184 |
| 5,123,017 | 6/1992 | Simpkins et al. | 371/15.1 |
| 5,195,029 | 3/1993 | Murai et al. | 364/184 |

FOREIGN PATENT DOCUMENTS

| | | |
|---|---|---|
| 0335380 | 10/1989 | European Pat. Off. |
| 0364151 | 4/1990 | European Pat. Off. |

*Primary Examiner*—Reba I. Elmore
*Assistant Examiner*—Thomas E. Brown
*Attorney, Agent, or Firm*—Herbert L. Lerner; Laurence A. Greenberg

[57] ABSTRACT

A diagnosis system for a plant, in particular for a power station plant, such as for a turbo-generator of a steam turbine plant, having a number of interacting plant parts, includes a module being associated with the plant parts for on-line acquisition of measured values and for controlling and processing the measured values. A data bus is connected to the module through interfaces for the transmission of plant-relevant measured values. A coupling module is connected to the data bus for requesting and passing on measured values. An administration module is connected to the coupling module for distribution of the measured values. A number of analysis modules are connected to the administration module for content-dependent processing of the measured values and for outputting characteristics derived therefrom. A memory module is connected to the analysis modules for storing the characteristics from at least one of the analysis modules. A number of module-specific operator modules is connected to the memory module for obtaining the characteristics from the memory module.

6 Claims, 1 Drawing Sheet

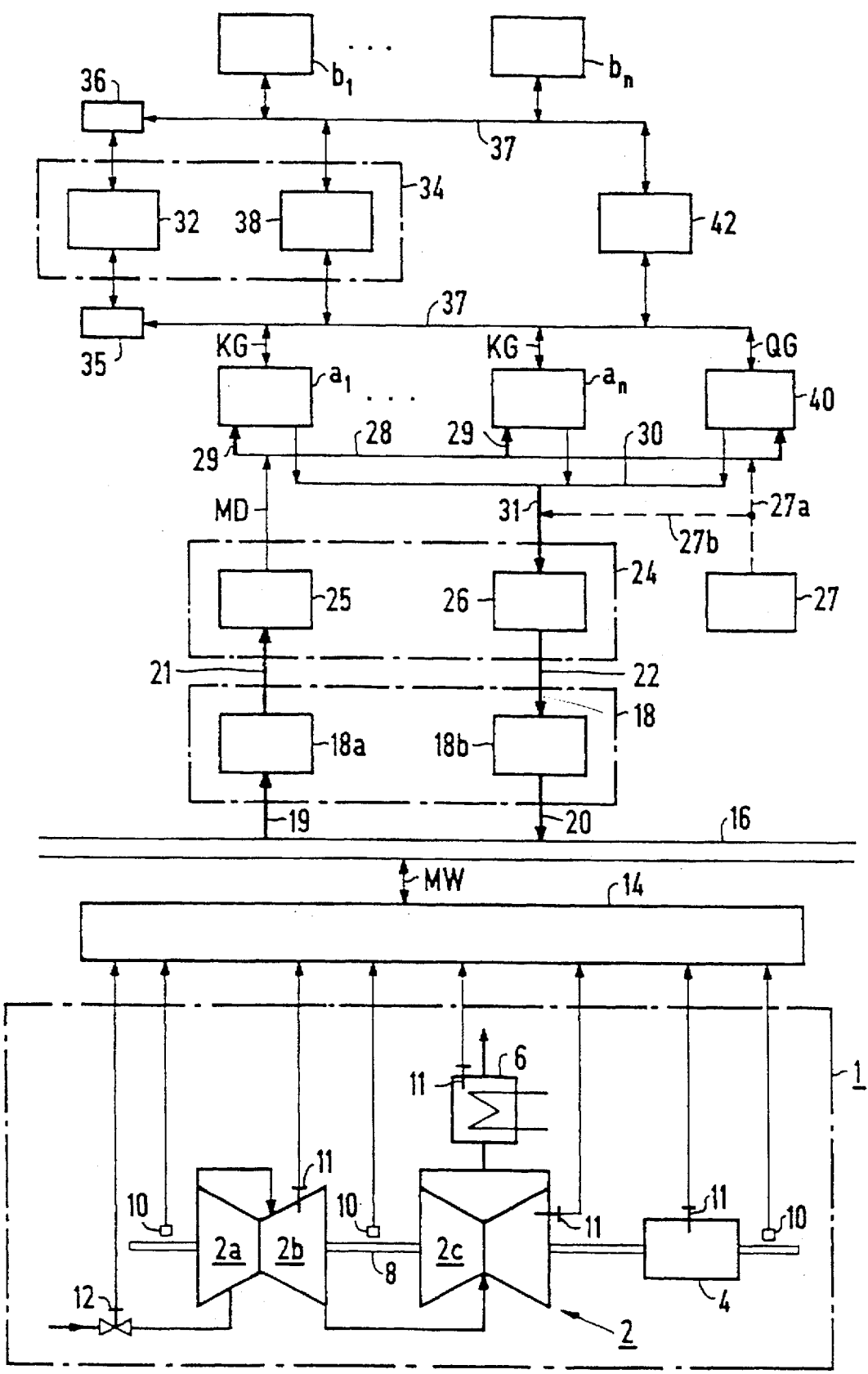

DIAGNOSIS SYSTEM FOR A PLANT

CROSS-REFERENCE TO RELATED APPLICATION

This application is a continuation of application Ser. No. 08/437,278, filed on May 8, 1995, now abandoned which is a Continuation of International Application Serial No. PCT/DE93/01012, filed Oct. 25, 1993 published as WO94/11822, May 26, 1994.

BACKGROUND OF THE INVENTION

FIELD OF THE INVENTION

The invention relates to a diagnosis system for a plant, in particular a power station plant, for example for a turbo-generator of a steam turbine plant, having a module for on-line measured-value acquisition as well as for controlling and processing the measured values, being assigned to a number of interacting plant parts and being connected through interfaces to a data bus for the transmission of plant-relevant measured values.

In a power station plant, monitoring devices are intended to indicate current operating states of the plant process and to report deviations from a desired state. An extensive measured data acquisition of the operating values of the plant parts is required for that purpose. In a steam turbine plant, those parts are, inter alia, the components and auxiliary systems of the turbo-generator as a functional group, i.e. the steam turbine, a generator coupled to the latter by means of a shaft and a condenser. The signal or data interchange usually takes place through a bus system within a control system which is shared by the plant parts and by which the plant process is controlled and monitored partially or fully automatically.

With increasing energy or work utilization of such plants, the requirements with respect to plant availability also increase, with an aim being particularly short downtimes for servicing and maintenance measures. The consequent increasing complexity of the monitoring devices leads to increasing difficulties in handling by the operating personnel in a control station, to be precise with regard to both an extensive overview of the current state of the plant and to early fault detection. Although with an increasing degree of automation in a hierarchically constructed control system, such as is known from Published European Application 0 242 609, a pyramidically increasing information compaction of the data supplied by measured-value acquisition is accomplished, the assessment of the measured values is nevertheless left to the operating personnel. In addition, with increasing complexity of the monitoring system, its susceptibility to faults increases.

In a diagnosis system with a distributed structure which is furthermore known from Published European Application 0 364 151 A2, corresponding to U.S. Pat. No. 4,967,337, an opinion regarding operating values is likewise left to operating personnel.

SUMMARY OF THE INVENTION

It is accordingly an object of the invention to provide a diagnosis system for a power station plant, in particular a steam turbine plant, which overcomes the hereinafore-mentioned disadvantages of the heretofore-known devices of this general type and with which a high level of operational reliability and a high level of plant availability are achieved on the basis of an extensive measured-value acquisition.

With the foregoing and other objects in view there is provided, in accordance with the invention, in a diagnosis system for a plant, in particular for a power station plant, such as for a turbo-generator of a steam turbine plant, having a number of interacting plant parts, the improvement comprising a module being associated with the plant parts for on-line acquisition of measured values and for controlling and processing the measured values; a data bus being connected to the module through interfaces for the transmission of plant-relevant measured values; a coupling module being connected to the data bus for requesting and passing on measured values; an administration module being connected to the coupling module for distribution of the measured values; a number of analysis modules being connected to the administration module for content-dependent processing of the measured values and for outputting characteristics derived therefrom; a memory module being connected to the analysis modules for storing the characteristics from at least one of the analysis modules; and a number of module-specific operator modules being connected to the memory module for obtaining the characteristics from the memory module.

Through the use of a module-specific analysis of the measured values in the function-specific analysis modules, an overall statement about the state of the plant is derived from an extensive measured-value acquisition. This is based, for example, on the tried-and-tested functional groups of a steam turbine plant, such as the turbo-generator with the corresponding components or plant parts. It follows from this that a measured-value acquisition and data transmission system present in an already existing power station control system can be substantially retained as the system framework, to be expanded merely by the analysis modules and the operator modules assigned to the latter on a user interface and, if appropriate, by additional, module-specific measured value acquisition modules.

In accordance with another feature of the invention, in order to provide adaptation to the system framework, there is provided a coupling module adapted to the data bus. The coupling module is then used to request the measured values and pass them on to the administration module.

In each analysis module, function-specific measured values are analyzed on the basis of a predetermined algorithm by desired/actual value comparisons being carried out, with the measured values being checked for limit values and/or the measured values entering into the mathematical calculations, outputting new, derived characteristic data or characteristics, with a new dimension if appropriate. For example, in an analysis module assigned to the entire turbo-generator, the measured values processed in this module can be used to determine an efficiency, which is stored as a characteristic and at the same time as a diagnosis in the storage module. If, in addition to the measured values already made available, further measured values are required for the derivation of a diagnosis statement, they can be requested through the administration module.

Therefore, in accordance with a further feature of the invention, in addition to a message distributor, the administration module also includes an acknowledgement accumulator for controlling the communication with the measured value acquisition module, for example for requesting individual measured values or measured-value packets.

Each analysis module is advantageously self contained. The self-contained nature of an analysis module means that, wherever possible, it carries out the possible analyses and diagnoses itself on the basis of the measured values available to it and is consequently autonomous in a certain sense. There are therefore no relationships to or dependencies on other function-specific analysis modules. In addition, due to the interposing of the storage module, each analysis module is also isolated from the module-specific operator module assigned to it. Consequently, the operator module cannot be used directly to call up the compiled characteristics from the analysis module, but only by accessing the storage module. Each analysis module is consequently isolated from the operator module assigned to this analysis module by the storage module.

In accordance with an added feature of the invention, the storage module is formed of a data bank for archiving and a temporary ring memory for the short-term intermediate storage of current characteristics.

Through the use of this isolation of the analysis modules from the operator modules, the remaining modules, i.e. the coupling module, the administration module and the storage module, can be advantageously integrated into the already existing system framework of a usually present process control system of a power station plant. As a result, free configurability of the diagnosis system is achieved in a particularly simple way, with the depth of a diagnosis being increased simply by incorporating additional analysis modules and associated operator modules in the system framework.

In order to permit the consistent use of a modular method when constructing the diagnosis system, a module-wide instance is provided for those diagnoses which individual analysis modules cannot carry out, for example because results from other analysis modules are required for them.

Therefore, in accordance with an additional feature of the invention, an inference component is provided for the evaluation of a knowledge base, and a diagnosis result is derived from the analysis module or each analysis module on the basis of rules laid down in the knowledge base, upon output of a qualified parameter from the inference component. Since the rules are contained in the knowledge base in the manner of an expert system in the general form "if condition, then conclusion", a qualification of the characteristics into qualitative parameters or verbal expressions takes place within the analysis module or each analysis module.

For example, a characteristic which specifies that a desired value is exceeded by a certain absolute amount is converted into the qualified parameter "the value is too high". Whether an analysis module is implemented algorithmically and/or knowledge-based depends substantially on the nature of the problem, i.e. whether a problem and a solution can be described precisely or are based on experience.

In accordance with a concomitant feature of the invention, in order to ensure a separation between action functionality and operator functionality, the analysis modules and the operator modules are isolated from one another by means of the storage module.

The advantages achieved by the invention are, in particular, that the diagnosis system can be extended in a simple way and consequently the depth of the diagnosis can be increased, due to the free configurability associated with the modular construction of the diagnosis system. In addition, an extremely desirable relieving of operating personnel is achieved since it is possible detect an imminent malfunction at an early time and quickly locate the cause of a malfunction which has already happened.

Other features which are considered as characteristic for the invention are set forth in the appended claims.

Although the invention is illustrated and described herein as embodied in a diagnosis system for a plant, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The FIGURE of the drawing is a schematic circuit diagram of a plant to be monitored and a function diagram of a diagnosis system with modules and components disposed on five levels which are constructed one on the other, for an exemplary embodiment of the invention.

DESCRIPTION OF THE PREFERRED EMBODIMENTS

Referring now to the single figure of the drawing in detail, there is seen an exemplary embodiment a plant process 1 to be monitored, which is a turbo-generator of a steam turbine plant having a steam turbine 2, a generator 4 and a condenser 6. The steam turbine 2 includes a high-pressure part 2a, an intermediate-pressure part 2b and a low-pressure part 2c, which drive the generator 4 through a common shaft 8. The turbo-generator is provided with a multiplicity of different measuring points 10, 11, 12 for mapping the actual state of the plant process and its boundary conditions. The measured values acquired during operation of the plant, i.e. on-line, are checked in a module 14 for measured-value acquisition, processed and passed through suitable interfaces as processed measured values MW to a data bus 16, which is a component part of a usually already existing process control system of the plant.

The module 14, which acquires the measured values synchronously, covers the real-time aspects inevitably associated with the plant process 1.

The processed measured values MW are passed on through the data bus 16 either directly or on request to a coupling module 18, which is made up of a first element 18a for measured-value/system transmission and a second element 18b for system/measured-value transmission. This transmission is indicated by bold arrows 19, 21 and oppositely pointing arrows 20, 22. The arrows 19 to 22 in each case symbolize a data buffer for a time-delayed data relay or data request. The coupling module 18 forms a coupling level within the diagnosis system.

The coupling module 18 is connected through the data buffer which is symbolized by the arrows 21 and 22, to an administration module 24, which is made up of a message distributor 25 and an acknowledgement accumulator 26. The administration module 24 forms an administration level with the diagnosis system. There, the measured values MW, which are provided with an identification in the measured-value acquisition module 14, can be freely configured, distributed over a number of analysis modules $a_1 \ldots a_n$ and relayed to the latter. In order to provide for the freely adjustable initiation of actions, a time control 27 is provided as a further function of the administration level.

The measured values MW, which are provided with a module-specific identification, are passed on as measured data MD from the message distributor 25 through a communication channel 28 to the corresponding analysis modules $a_1 \ldots a_n$. In this case, the analysis modules $a_1 \ldots a_n$ are in turn coupled through data buffers, which are symbolized by arrows 29, to the communication channel 28. Each analysis module $a_n$ can also request additional measured values MW through the acknowledgement accumulator 26, which is connected through a communication channel 30 and a data buffer symbolized by an arrow 31, to the analysis modules $a_1 \ldots a_n$. The initiation of such time-dependent system activities is performed by means of the time control 27 which emits trigger signals to the analysis modules $a_1 \ldots a_n$ or to the administration module 24, as is indicated by dashed arrows 27a, 27b.

The analysis modules $a_1 \ldots a_n$ are implemented substantially algorithmically and are therefore rather of a mathematical orientation. In the individual analysis modules $a_1 \ldots a_n$, function-specific values are analyzed, characteristic values are calculated and desired/actual value comparisons are carried out. Wherever possible, each analysis module $a_1 \ldots a_n$ carries out various analyses and diagnoses itself on the basis of the measured data available to it and is consequently autonomous in a certain sense. In order to be able to utilize the advantages associated with the modular construction of the diagnosis system in the analysis area, there are consequently no relationships or dependencies between the individual analysis modules $a_1 \ldots a_n$.

In the function-specific and plant-part-oriented analysis modules $a_1 \ldots a_n$, the measured data MD consequently undergo a module-specific measured-value processing and are passed on as derived characteristic data or characteristics KG.

The substantially numerical characteristics KG differ from the original measured values MW in particular in that they are new, derived parameters, possibly with a different dimension. For example, in an analysis module $a_n$, thermodynamic data can be calculated by using a predetermined calculation basis from the measured values MW acquired continuously or at time intervals. A characteristic KG that is derived in this way may, for example, be an efficiency, and consequently already an advance diagnosis. The analysis modules $a_1 \ldots a_n$ form an action level within the diagnosis system.

The derived characteristics KG are stored in a data bank 32 of a memory module 34 and are archived there. The data bank 32 is connected through interfaces 35, 36 to a system of communication channels 37, through which general data or specific characteristics KG can be accessed in the data bank 32 by means of module-specific operator modules $b_1 \ldots b_n$. Fast data access is made possible by a ring or circulating memory 38 of the storage module 34, which serves for brief, temporary or intermediate storage of the characteristics KG from the analysis modules $a_1 \ldots a_n$. The storage module 34 forms a data level within the diagnosis system and serves for isolating the action level formed by the analysis modules $a_1 \ldots a_n$, and a presentation level formed by the operator modules $b_1 \ldots b_n$, of the diagnosis system.

The isolation of the action level and the presentation level by the data level permits free configurability of the diagnosis system. In this case, the action level and the presentation level can be extended in a simple way by additional analysis modules $a_n$ or by additional module-specific operator modules $b_n$. The modules 18, 24 and 34 of the other levels, i.e. of the coupling level, of the administration level or of the data level, occur only once in a system framework. Consequently, all that is required for an extension is to incorporate into the corresponding level additional analysis modules $a_n$ and operator modules $b_n$.

In order to permit the consistent use of a modular method when constructing the diagnosis system, a module-wide instance is provided for those diagnoses which individual analysis modules $a_n$ cannot carry out because results from other analysis modules $a_1 \ldots a_n$ are required for them. However, since a module-wide diagnosis is significantly more complex than a module-specific diagnosis, a knowledge-based or expert system is provided for accomplishing module-wide diagnosis tasks. For this purpose, an inference component 40 is disposed on the action level and a knowledge base 42 is disposed on the data level. The inference component 40 and the knowledge base 42 in each case can be used both module-specifically and module-widely.

The inference component 40 communicates through the channels 28 and 30 with the analysis modules $a_1 \ldots a_n$ or the administration module 24 and through the system of channels 37 with the memory or storage module 34. The knowledge base 42 is connected through the system of channels 37 to the inference component 40, the data bank 32 and the operator modules $b_1 \ldots b_n$.

Since an expert system generally processes verbally described facts, the characteristics KG must first of all be converted into verbal expressions or qualified parameters QG. This qualification expediently takes place in the analysis modules $a_1 \ldots a_n$. However, the qualification may also take place in a manner, that is not represented in any more detail, in a module-wide qualification component shared by all of the analysis modules $a_1 \ldots a_n$. In order to represent and process uncertain knowledge, use may be made in this case of fuzzy logic, which allows continuous intermediate values between definite yes/no statements. The knowledge representation and inference are therefore constructed for processing by means of fuzzy logic. Consequently, the expert system formed by the knowledge base 42 and the inference component 40 allows the processing of uncertain knowledge and, in addition, the processing of "defined" that is numerical, values or parameters KG. The latter are converted into the linguistic variables which are usual in the case of fuzzy logic, i.e. into qualified parameters QG.

For example, a value calculated in an analysis module $a_n$ as $P(H_2)=p_{desired}-0.3$ bar representing the fact that "the hydrogen pressure in the generator housing lies 0.3 bar below the desired pressure" becomes the verbal statement "the hydrogen pressure in the generator housing is low". The evaluation of the knowledge base 42 in this actual application takes place by means of an inference component 40, which controls the processing of the knowledge in the form of logical consequences. For instance, given the existence of the fact "the hydrogen pressure in the generator housing is low", by evaluation of the rule stored in the knowledge base 42 "if the hydrogen pressure in the generator housing is low, the generator housing is leaking", "the generator housing is leaking" is derived as the diagnosis result. This diagnosis result is stored in the storage module 34. The diagnosis result is inquired through an operator module $b_n$ which is assigned to the functions of the generator 4, by access to the data bank 32, for example for an off-line diagnosis, or through the temporary ring memory 38, for example for an on-line diagnosis.

Through the use of the diagnosis system formed by the levels constructed one on the other, an overall statement about the state of the plant process 1 is derived from an extensive measured-value acquisition during the operation of the power station plant, with the result that a malfunction can be detected at an early time and measures for an improvement in the operating state can be derived.

In consideration of the respective functions and groups of the turbo-generator of a steam turbine, the modular construction of the diagnosis system advantageously permits a high degree of flexibility in the adaptation to plant-specific tasks. Therefore, the diagnosis system can be freely configured in a simple way, with it being possible for the depth of the diagnosis to be increased by the incorporation of further analysis modules $a_1 \ldots a_n$ and corresponding module-specific operator modules $b_1 \ldots b_n$.

We claim:

1. In a diagnosis system for a plant having a number of interacting plant parts, the improvement comprising:

a module being associated with the plant parts for on-line acquisition of measured values and for controlling and processing the measured values;

a data bus being connected to the module through interfaces for the transmission of plant-relevant measured values;

a coupling module being connected to said data bus for requesting and passing on measured values;

an administration module being connected to said coupling module for distribution of the measured values;

a number of analysis modules being connected to said administration module for content-dependent processing of the measured values and for outputting characteristics derived therefrom;

a memory module being connected to said analysis modules for storing the characteristics from at least one of said analysis modules;

a number of module-specific operator modules being connected to said memory module for obtaining the characteristics from said memory module; and said memory module isolating said operator modules from said analysis modules for allowing operator module communications with said memory module without affecting data processing in said analysis modules.

2. The diagnosis system according to claim 1, wherein said administration module includes a message distributor and an acknowledgement accumulator.

3. The diagnosis system according to claim 1, wherein said memory module includes a data bank for archiving and a ring memory for brief intermediate storage of current characteristics.

4. The diagnosis system according to claim 1, including a knowledge base for storing rules, and a module-wide inference component connected between said knowledge base and said analysis modules for evaluating said knowledge base and for outputting a qualified parameter to derive a diagnosis result from at least one of said analysis modules on the basis of the rules stored in said knowledge base.

5. In a diagnosis system for a power station plant having a number of interacting plant parts, the improvement comprising:

a module being associated with the plant parts for on-line acquisition of measured values and for controlling and processing the measured values;

a data bus being connected to the module through interfaces for the transmission of plant-relevant measured values;

a coupling module being connected to said data bus for requesting and passing on measured values;

an administration module being connected to said coupling module for distribution of the measured values;

a number of analysis modules being connected to said administration module for content-dependent processing of the measured values and for outputting characteristics derived therefrom;

a memory module being connected to said analysis modules for storing the characteristics from at least one of said analysis modules;

a number of module-specific operator modules being connected to said memory module for obtaining the characteristics from said memory module; and said memory module isolating said operator modules from said analysis modules for allowing operator module communications with said memory module without affecting data processing in said analysis modules.

6. In a diagnosis system for a turbo-generator of a steam turbine plant having a number of interacting plant parts, the improvement comprising:

a module being associated with the plant parts for on-line acquisition of measured values and for controlling and processing the measured values;

a data bus being connected to the module through interfaces for the transmission of plant-relevant measured values;

a coupling module being connected to said data bus for requesting and passing on measured values;

an administration module being connected to said coupling module for distribution of the measured values;

a number of analysis modules being connected to said administration module for content-dependent processing of the measured values and for outputting characteristics derived therefrom;

a memory module being connected to said analysis modules for storing the characteristics from at least one of said analysis modules;

a number of module-specific operator modules being connected to said memory module for obtaining the characteristics from said memory module; and said memory module isolating said operator modules from said analysis modules for allowing operator module communications with said memory module without affecting data processing in said analysis modules.

* * * * *